United States Patent [19]

Kubicek

[11] 3,728,407

[45] Apr. 17, 1973

[54] PROCESS FOR THE PREPARATION OF 1,2-BIS(3-CYCLOHEXEN-1-YL) ETHYLENE USING BASE-TREATED OLEFIN DISPROPORTIONATION CATALYSTS

[75] Inventor: Donald H. Kubicek, Bartlesville, Okla.

[73] Assignee: Phillips Petroleum Company, Bartlesville, Okla.

[22] Filed: Dec. 22, 1971

[21] Appl. No.: 211,068

[52] U.S. Cl. ....................260/666 PY, 260/666 A
[51] Int. Cl. ...............................................C07c 13/38
[58] Field of Search....................260/666 A, 666 PY

[56] References Cited

UNITED STATES PATENTS 3,463,828  8/1969  Crain..............................260/666 A
3,424,811  1/1969  Maugo................................260/680

FOREIGN PATENTS OR APPLICATIONS 1,056,980  2/1967  Great Britain.....................260/683.2

*Primary Examiner*—Delbert E. Gantz
*Assistant Examiner*—Veronica O'Keefe
*Attorney*—Quigg & Oberlin

[57] ABSTRACT

The olefin disproportionation conversion of 4-vinylcyclohexene to 1,2-bis(3-cyclohexen-1-yl)ethylene is improved by using a base-treated olefin disproportionation catalyst which is washed with a polar solvent (e.g., water) subsequent to the base treatment and prior to activation of the catalyst.

8 Claims, No Drawings

PROCESS FOR THE PREPARATION OF 1,2-BIS(3-CYCLOHEXEN-1-YL) ETHYLENE USING BASE-TREATED OLEFIN DISPROPORTIONATION CATALYSTS

BACKGROUND OF THE INVENTION

1. Field of the Invention

This invention relates to olefin disproportionation. In a further aspect, the invention relates to an improved catalyst for the olefin disproportionation reaction. In a further aspect this invention relates to an improved process for the preparation of 1,2-bis(3-cyclohexen-1-yl)ethylene from 4-vinyl-cyclohexene.

2. Description of the Prior Art

The preparation of 1,2-bis(3-cyclohexen-1-yl)ethylene (hereinafter referred to as BCE) from 4-vinylcyclohexene (hereinafter referred to as VCH) has been described in U.S. Pat. No. 3,463,828 of Crain (1969).

The product BCE has been found to be particularly useful in the preparation of 1,2-bis(3,4-dibromocyclohexyl)-1,2-dibromoethane which is a flame retardant for polypropylene.

In addition, the prior art in the olefin disproportionation field has recognized that it is oftentimes advantageous to treat solid olefin disproportionation catalysts with a base material, e.g., potassium hydroxide, to increase the selectivity of the olefin disproportionation reaction. See, for example, British Patent No. 1,056,980 (1967). This increase in selectivity is principally a result of neutralizing acid sites on the catalyst supports which thereby inhibits polymerization type reactions of the olefinic feed materials. Thus, U.S. Pat. No. 3,463,828 teaches that a tungsten or molybdenum supported catalyst treated with a small amount of an alkali metal is the preferred catalyst for conversion of VCH to BCE.

The addition of base compounds to a solid olefin disproportionation catalyst prior to activation of the composite catalyst is a very simple procedure. Because solid supports employed in olefin disproportionation catalysts are mildly acidic, the prior art has taught that the catalyst is merely contacted with a base solution for a sufficient time to allow the solution to become essentially neutral to a suitable pH indicator, indicating complete uptake of the base followed by decantation of the aqueous solution from the catalyst. The catalyst is then activated for use in an activating atmosphere at high temperature.

OBJECTS OF THE INVENTION

It is an object of this invention to improve the conversion of VCH to BCE. Other objects and advantages of this invention will be apparent to those skilled in the art from the following summary of invention, detailed description of the invention, examples and claims.

SUMMARY OF THE INVENTION

I have discovered that the activity of a base-treated olefin disproportionation catalyst when converting VCH to BCE can be significantly increased when the base-treated catalyst is washed with a polar solvent prior to activation. This is indeed surprising because when the same catalyst is used to disporportionate simple olefins the washing step has no significant effect on the catalyst activity. Accordingly, my process comprises contacting 4-vinyl-cyclohexene with a base-treated olefin disproportionation catalyst under conditions suitable to provide BCE wherein the catalyst has been washed with a polar solvent after base treatment has been completed but prior to activation of the catalyst.

DETAILED DESCRIPTION OF THE INVENTION

The treatment of the catalyst to provide the improved activity of the invention is simple and straightforward. The catalyst composite, containing a minor amount of a promoter compound and a major amount of an acidic support material, is treated with a solution sufficient to provide from about 0.001 to 3 weight parts, preferably 0.5 to 2.5, of base per unit weight of the composite. Complete uptake of the base is indicated when pH indication shows a neutral solution. The aqueous solution is then suitably removed from the catalyst composite as, for example, by decantation, filtration, and the like. The catalyst composite is then subjected to washing with a polar solvent, preferably water, although up to $C_5$ alcohols such as methyl, ethyl, sec-butyl, tert-amyl alcohols and the like can be used.

The base compounds employed in my process are the same as those reported in the prior art. Generally, any water soluble alkali or alkaline earth metal compounds can be used. However, because of low cost and availability, alkali metal hydroxides, oxides, carbonates, bicarbonates and acetates are preferred. Of these, the hydroxides and carbonates of potassium are equally suitable.

The amount of polar solvent used depends primarily on the method of treatment. Any method of treatment which intimately associates the catalyst composite with the polar solvent can be used. Preferably, the catalyst composite is covered with the polar solvent in a container, mixed, the catalyst particles allowed to settle, and the solvent removed in the same manner as the neutral solution referred to above. Although one washing step is generally sufficient, it is preferred that the step be repeated at least twice, although additional washings can be used.

The temperature of treatment is up to the boiling point of polar solvent, although ambient or slightly elevated temperatures are preferred for convenience.

The polar solvent treated catalyst of the invention has superior activity in converting VCH to BCE and ethylene. Another advantage of the present invention is that the color of the BCE product is improved when using my washed catalyst.

The olefin disporportionation catalyst which is treated to provide my improved catalyst is any solid catalyst having the ability to disproportionate propylene to ethylene and butenes. Generally preferred are those catalysts comprising a minor amount of a promoter compound of an oxide of molybdenum, tungsten, or rhenium and a major amount of a catalytic refractory support material which is alumina, silica, or aluminum phosphate. These catalysts have been reported in the prior art, and their preparation, activation, and use have been described.

Olefin disproportionation catalysts typically demonstrate characteristic temperature ranges at which the particular catalyst has optimum activity. Generally, a catalyst can be selected which has good activity in the temperature range of from about −60° to about 1200°F. However, because vinylcyclohexene compounds undergo rapid isomerization at temperatures in excess of about 380°F, those catalysts which exhibit good activity below this temperature are preferred. Especially suitable catalysts which can be used are rhenium heptoxide on alumina, cobalt oxide-molybdenum oxide on alumina and molybdenum oxide on alumina. These catalysts typically contain from about 0.5 to about 30 weight percent of $MoO_3$ or $Re_2O_7$, from about 0 to about 20 weight percent CoO, and from 50 to about 99 weight percent $Al_2O_3$. The temperature of treatment using these preferred catalysts is on the order of −10° to about 380°F, although temperatures in the range of from about 190°F to about 270°F are suitable. Pressures on the order of subatmospheric to 500 psig can be used while atmospheric pressures are preferred. Weight hourly space velocities from about 0.001 to about 100 can be used although relatively low rates are preferred for high conversions, such as from 0.5 to about 2.5.

Although the inventive process finds particular utility in converting 4-vinylcyclohexene to BCE, substituted 4-vinylcyclohexene hydrocarbons can also be used. Substituted vinyl cyclohexenes having the formula

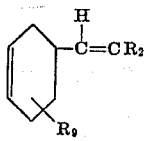

wherein each R is hydrogen, alkyl, cycloalkyl, aryl, or combinations thereof including alkaryl and aralkyl, each R having from one to 20 carbon atoms and being the same or different moieties, and wherein the total number of carbon atoms in the entire molecule does not exceed about 30. Suitable nonlimiting examples include: 3-ethyl-4-vinylcyclohexene, 4-(1-propenyl)cyclohexene, 6-(p-tolyl)-4-vinylcyclohexene, 2-(n-nonyl)-5-(sec-butyl)-4-(1-hendecyl)cyclohexene, 6-cyclohexyl-4-vinylcyclohexene, 3-phenyl-4-vinylcyclohexene, and 2-benzyl-4-vinylcyclohexene.

The feed 4-vinylcyclohexene is preferably treated prior to the conversion reaction to remove undesirable constituents which adversely affect the reaction. For example, treatment by passage of the feed over a 13X molecular sieve followed by distillation through a packed column generally provides high conversions and good selectivities.

The invention can be further understood from the following examples which are presented for the purpose of illustrating the invention. However, they should not be construed as limiting the invention as described above.

EXAMPLE

An olefin disproportionation catalyst containing about 12.7 weight percent molybdenum trioxide and about 87.3 weight percent alumina was treated with potassium hydroxide in the following manner. An aqueous solution of KOH was made by adding 2 grams of Analytical Reagent Grade KOH per 100 grams of catalyst to a sufficient amount of water for the resulting solution to cover the catalyst particles. The catalyst was in contact with this solution for 1 hour after which time the solution was neutral as shown by pH indicator paper. Thus, 2.0 g of KOH/100 g of catalyst had been taken up by the catalyst.

The aqueous solution was removed from the catalyst particles by decantation and the catalyst was activated in flowing air at a temperature of 1000°F for 18 hours.

A second catalyst was prepared using the identical procedure as above, except that after decantation of the aqueous solution, the catalyst was washed with two portions of distilled water. In each instance, the amount of water used was at least sufficient to cover the particulate catalyst, followed by decantation of the solutions. After the final wash, this catalyst was activated as mentioned above.

Each of these catalysts was used to convert 4-vinylcyclohexene to BCE and octene-1 to its disproportionation products. In each run, 10.0 grams of activated catalyst was placed in a tube above a vessel to which 30 ml of the feed olefine was added. A condenser was placed above said tube. The feed olefin was purified in each run by passage through a 13X molecular sieve and a packed distillation column. The olefin was heated by means of an electrical heating mantle operated at the same voltage in each test. The zero time for each test was arbitrarily taken at that point where a thermometer above the catalyst bed reached 50°C. The end point for each test was determined by recording the time for the pot temperature to reach 175°C. The 175°C point corresponds to an approximate 50 percent conversion. All products were determined by GLC analysis. The conditions and results of those tests are recorded below in Table I.

TABLE I

Conditions

| | Run 1 | Run 2 | Run 3 | Run 4 |
|---|---|---|---|---|
| Catalyst ($MoO_3Al_2O_3$) KOH treated | No water wash | No water wash | With water wash | With water wash |
| Feed | Octene-1 | VCH | Octene-1 | VCH |
| Results | | | | |
| Activity, minutes | 30.5 | 32.0 | 30.5 | 26.0 |
| Selectivity | 86 mol % | 96 mol % | 83 mol % | 96 mol % |
| Product color | | yellow | | very Light Yellow |

The above data illustrate that the activity for both the unwashed and washed catalyst for octene-1 disproportionation is the same. The water washing does decrease selectivity slightly when converting octene-1 under these test conditions. However, a remarkable improvement in the activity of the water washed catalyst is found when treating VCH without sacrificing selectivity of the reaction to BCE. In addition, the color of the BCE product is also improved when using my catalyst.

Reasonable variations and modifications of my invention will be apparent to those skilled in the art without departing from the spirit and scope thereof.

What is claimed is:

1. In a process of converting 4-vinylcyclohexene or substituted 4-vinylcyclohexene to 1,2-bis(3-cyclohexen-1-yl)ethylene or substituted derivatives thereof in the presence of an olefin disproportionation catalyst which has been treated with water-soluble alkali or alkaline earth metal compounds and activated at high temperatures in flowing air, the improvement comprising contacting the catalyst with a polar solvent selected from the group water or $C_1$ to $C_5$ alcohol subsequent to treatment with the water-soluble alkali or alkaline earth metal compounds and prior to activation of the catalyst at high temperature in flowing air.

2. The process of claim 1 wherein the catalyst is contacted with at least two portions of distilled water each in an amount sufficient to cover the catalyst particles which are contained in a vessel.

3. The process of claim 1 wherein 4-vinylcyclohexene is converted to 1,2-bis(3-cyclohexen-1-yl)ethylene.

4. The process of claim 1 wherein the catalyst comprises a small amount of a promoter compound which is molybdenum oxide or rhenium oxide and a major amount of a catalytic refractory support which comprises alumina.

5. The process of claim 1 wherein the alkali or alkaline earth metal compound is a hydroxide, carbonate, bicarbonate, or acetate.

6. The process of claim 4 wherein the catalyst comprises cobalt-molybdate on alumina or molybdenum oxide on alumina.

7. The process of claim 5 wherein the alkali or alkaline earth metal compound is a hydroxide, carbonate, bicarbonate, or acetate of potassium.

8. The process of claim 5 wherein the alkali or alkaline earth metal compound is potassium hydroxide.

* * * * *